United States Patent
Richter

(10) Patent No.: US 8,410,359 B2
(45) Date of Patent: Apr. 2, 2013

(54) CONNECTOR FOR SOLAR MODULE

(75) Inventor: Michael Richter, Schalksmuehle (DE)

(73) Assignee: Lumberg Connect GmbH, Schalksmuehle (DE)

( * ) Notice: Subject to any disclaimer, the term of this patent is extended or adjusted under 35 U.S.C. 154(b) by 166 days.

(21) Appl. No.: 12/965,887

(22) Filed: Dec. 12, 2010

(65) Prior Publication Data
US 2011/0139483 A1   Jun. 16, 2011

(30) Foreign Application Priority Data

Dec. 12, 2009   (DE) .......................... 10 2009 058 118

(51) Int. Cl.
*H02G 3/08* (2006.01)

(52) U.S. Cl. ............. 174/50; 174/59; 174/559; 174/60; 439/535; 361/600

(58) Field of Classification Search .................. 174/50, 174/53, 57, 520, 58, 17 R, 559, 59, 60, 64, 174/138 F, 68.3, 487; 220/3.2, 3.3, 3.8, 4.02; 439/535, 76.1, 76.2, 709, 345; 361/600, 361/601, 679.01, 724, 823, 824, 825
See application file for complete search history.

(56) References Cited

U.S. PATENT DOCUMENTS

| | | | | |
|---|---|---|---|---|
| 3,617,612 A | * | 11/1971 | Patton ............................. | 174/59 |
| 3,994,555 A | * | 11/1976 | Konno et al. ................ | 439/345 |
| 7,097,516 B2 | * | 8/2006 | Werner et al. ................. | 439/709 |
| 7,444,743 B2 | * | 11/2008 | Feldmeier et al. ........... | 439/76.2 |
| 7,763,807 B2 | * | 7/2010 | Richter ....................... | 174/138 F |
| 7,767,906 B2 | * | 8/2010 | Chen et al. ................... | 174/68.3 |
| 7,824,189 B1 | * | 11/2010 | Lauermann et al. ......... | 439/76.1 |
| 7,939,754 B2 | * | 5/2011 | Richter et al. .................. | 174/50 |
| 7,960,650 B2 | * | 6/2011 | Richter et al. .................. | 174/50 |
| 8,003,885 B2 | * | 8/2011 | Richter et al. .................. | 174/50 |

FOREIGN PATENT DOCUMENTS

DE           202008006119 U       8/2008

OTHER PUBLICATIONS

Timbrell et al (WO 00/30216) "Solar Panel Connector" May 25, 2000.*

* cited by examiner

*Primary Examiner* — Angel R Estrada
(74) *Attorney, Agent, or Firm* — Andrew Wilford

(57) ABSTRACT

A box for connecting a solar panel to a cable has a generally planar flat base securable to a solar panel, forming a transversely open cavity for connection of elements of the solar panel with the cable, and formed with a laterally open aperture. A flat cover fittable transversely with the base to close the cavity is formed with an aperture forming with the aperture of the base when the cover is fitted to the base a hole that opens generally parallel to the base into the cavity and that is snugly fittable around the cable. A clip fixed on the base adjacent the aperture forms a mouth fittable around the cable extending through the hole and open generally parallel to the base.

6 Claims, 1 Drawing Sheet

CONNECTOR FOR SOLAR MODULE

FIELD OF THE INVENTION

The present invention relates to a connector for a solar module. More particularly this invention concerns a connection box for a solar panel.

BACKGROUND OF THE INVENTION

A typical connection box for a solar panel or module has a base that is attached to the solar module, in particular glued to the solar module and forming a cavity for various function parts and for electric cables and their contacts, and having a cover that closes off the cavity of the base from the environment. The connection box has a strain relief device for a cable entering into the connection box, formed in particular by an aperture or partial opening on the cover side and on the bottom side, together forming a cable hole that forms the strain relief device and is manufactured to be undersized in comparison with the cable so that it grips it tightly.

Connection boxes for solar modules are usually mounted on the back of the modules, in particular glued there. They serve to electrically connect the solar modules to a composite network. To do so, the film conductors, usually in the form of ribbon cables coming out of the solar module, are connected to single-pole round cables inside the connection box. In addition, the connection box serves to receive various function elements, for example, bypass diodes.

High demands are made of the stability and imperviousness of connection boxes for solar modules. The lifetime of such a connection box must correspond at least to the average lifetime of a solar module of 25 years with full functionality. For this reason, connection boxes for solar modules are made of high-grade plastic and accurately fitted components that are sealed with respect to one another in a complex manner. The interior is completely sealed off from the outside. To prevent condensate in the connection box, gas vents by which the interior is connected to the exterior environment are usually provided.

The strain relief of the conductors entering the connection box is especially important. In the prior art, these are usually operated by cap nuts that hold the cable via crimp tongues. These have the significant disadvantage that the cable must be inserted through a hole into the connection box in a very tedious manner, which significantly impedes machine preassembly of the connection box and its preassembly with cables entering the connection box. It is also known that the incoming cables may be provided with crimp sleeves that are supported on suitable components within the connection box in a stress-relieving manner.

DE 20 2008 006 119 discloses a strain relief designed for the applicant's connection box having an especially simple design but a satisfactory effect in all regards. In this case the cable is guided inside the connection box at a 45° angle. The entrance opening for the cable is formed by two complementary apertures in the base and the cover part. The important advantage of this connection box may be seen in the fact that the cable can be inserted into the base of the connection box and need not be pushed through a hole, so that machine preassembly is easily implementable. In addition, the strain relief based essentially only on the angled cable guide is technically extremely simple but is achieved in a highly effective manner. The apertures that form the entrance opening for the cable in the case of an installed cover, are manufactured to be slightly undersized relative to the cable so as to seal around and grip the cable.

However, in practice it has been found that additional strain relief for the connection box is advantageous in particular with respect to tension in the cable directed at an angle toward the fastening surface of the connection box on the solar module because these forces also act against the closing forces of the connection box.

OBJECTS OF THE INVENTION

It is therefore an object of the present invention to provide an improved solar-panel connection box that has an improved strain relief.

Another object is the provision of such an improved solar-panel connection box that has an improved strain relief that overcomes the above-given disadvantages, in particular that is of simple and inexpensive construction, yet that is particularly effective in preventing a pull on the cable away from the base from pulling the cover off the box.

SUMMARY OF THE INVENTION

A box for connecting a solar panel to a cable has according to the invention a generally planar flat base securable to a solar panel, forming a transversely open cavity for connection of elements of the solar panel with the cable, and formed with a laterally open aperture. A flat cover fittable transversely with the base to close the cavity is formed with an aperture forming with the aperture of the base when the cover is fitted to the base a hole that opens generally parallel to the base into the cavity and that is snugly fittable around the cable. A clip fixed on the base adjacent the aperture forms a mouth fittable around the cable extending through the hole and open generally parallel to the base.

The important advantage of the invention may be regarded as the fact that it does not alter the actual strain relief as in above-cited DE 20 2008 006 119 that is designed especially advantageously with regard to simplicity and the possibility of machine preassembly. An additional clip is provided on the base outside the cable hole and shaped to solidly resist forces away from the base, that is transverse to the planes of the normally planar base and cover.

To relieve the cover of the connection box from such forces, it is provided in particular that the clip is unitarily made with the base of the connection box.

To also enable simple mounting of the cable and in particular also machine preassembly of a connection box unit with cables, it is provided that the clip is designed as a hook with a clip mouth extending approximately open parallel to the face of the connection box, so that the cable can be pushed under the clip by a movement approximately parallel to the face of the base.

To secure the cable after mounting under the clip, the connection box is provided with a closure that closes the clip mouth for secure insertion of the cable under the clip, in which case the cover carries the closure.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
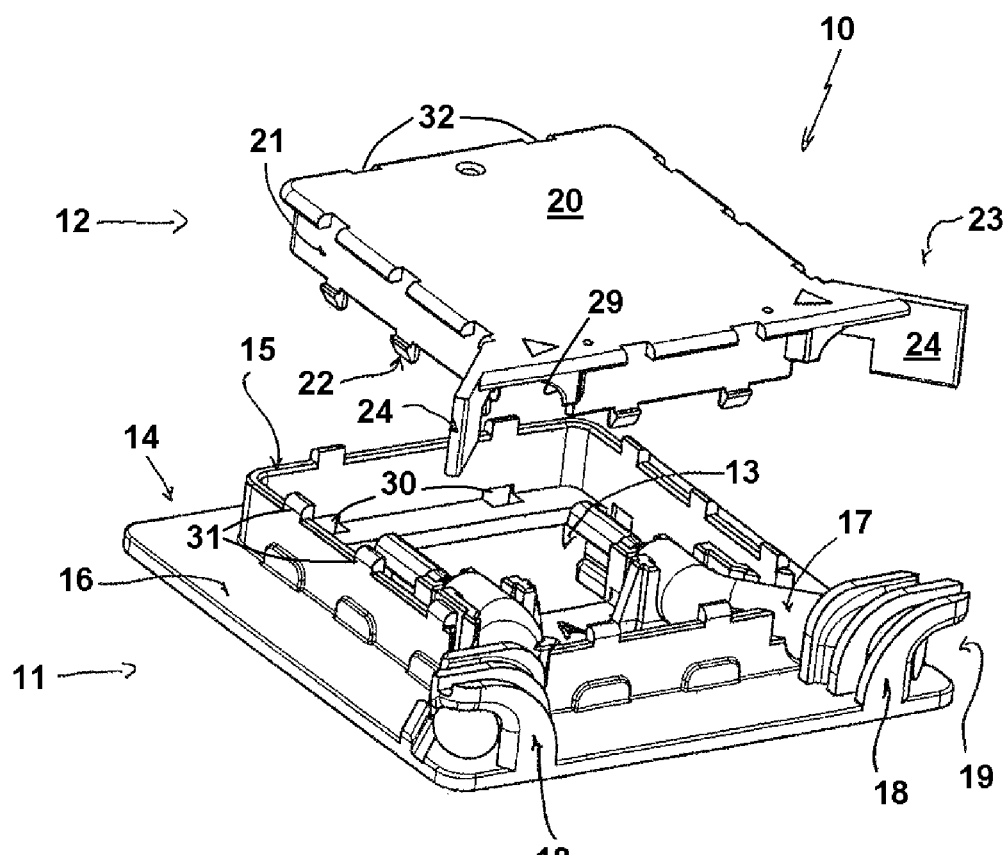
FIG. 1 is an exploded and partly schematic view of the connection box according to the invention.

As seen in FIG. 1 a basically parallepipedal connection box 10 according to the invention basically comprises a generally square base 11 and a somewhat smaller square cover 12. The base 11 forms a cavity 13 that is surrounded by a wall 15 extending perpendicularly from a floor plate 14. The wall 15 is set inward from the outer edge of the plate 14 such that a flat rim 16 projects outward in the plane of the plate 14 from the foot of the upstanding wall 15. Cables identified at 17 pass through apertures 28 into the cavity 13 at a strain-relief angle of approximately 45°.

According to the invention, an L- or C-shaped holddown clip or hook 18 that is a one-piece unitary part of the flat rim 16 is positioned in front of, that is outside, each of the apertures 28 in the wall 15 of the base 11. They are formed by an inner leg extending at a right angle from the flat rim 16 and an outer leg extending bent at an angle of approximately 90° from the outer end of the inner leg, that is parallel to the rim 16. Consequently, the clips 18 define a mouth 19 open laterally away from the inner leg, that is parallel to the planar rim 16, allowing a lateral pivoting of the cables 17 under the clips 18. This concrete embodiment of the clip 18 facilitates mounting of the cable 17 greatly because the cable 17 need not be poked through an opening, for example that would greatly impede either machine assembly or manual assembly.

The cover 12 has a planar top panel 20 that outwardly or upwardly closes the cavity 13 and from which projects a wall or collar 21 directed approximately vertically in the direction of the base 11. This flat cover wall 21 is provided with outwardly directed barbs 22 that engage in respective catch openings 30 in the wall 15 and securely anchor the cover 12 on the base. The cover flat wall 21 also has apertures 29 for insertion of the cable 17 into the cavity 13. The apertures 28 on the base 11 and the apertures 29 on the cover 12 are complementarily arcuate, each basically semicircular. When the cover 12 is attached to the base 11, these apertures 28 and 29 together form the a generally circular cable inlet hole that is of slightly smaller diameter than the respective cable 17. At each of the four straight sides of the wall 15 there are two or three upstanding tabs 31 that fit in complementary notches 32 of the cover 12.

Figure 2:
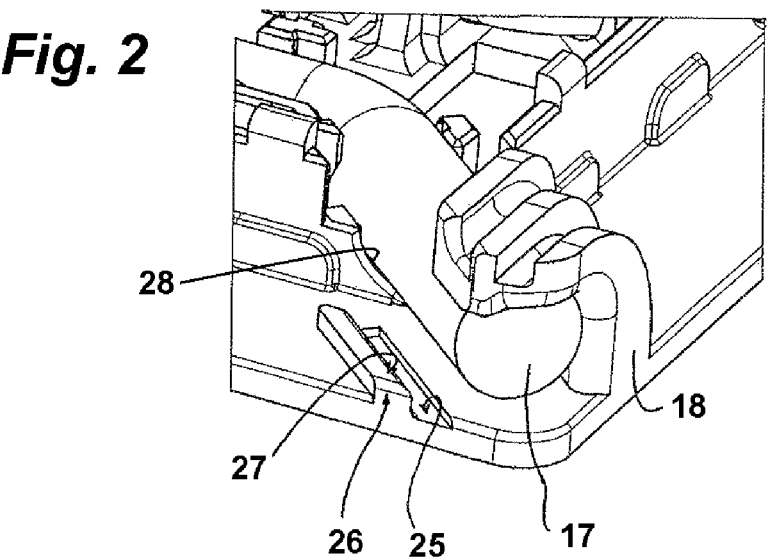
FIG. 2 is a large-scale view of a detail of FIG. 1.

The cover 12 comprises inventive closures 23 that are aligned so that they fit together with the respective clips 18, closing the clip mouth 19 when the cover 12 is mounted on the base. Here, the closures 23 are designed as planar or flat tongues 24 projecting perpendicularly from the top panel 20 and extending at 45° to each of the flanking walls 21 so as to lie on diagonals of the square cover 12. When the cover 12 is installed on the base 11, these tongues 24 sit in complementary grooves 25 formed in the flat rim 16 of the plate 14 for stabilization with respect to lateral forces, and an abutment ridge 26 is provided to the outside of each groove 25 so as to stabilize the tongue 24 fitted therein, resisting lateral forces on it from the compressed cable 17. In addition, the ridge 26 is provided with a guide bevel 27 that deflects or guides the tongue 24 into the respective the groove 25 (see FIG. 2) on fitting together of the base 11 and cover 12. In this way, the tongues 24 are automatically braced when the cover 12 is attached to the base 11, taking into account material tolerances and manufacturing tolerances.

Not shown here is a second embodiment of the invention, in which a clip open at one side is designed as a separate component. This clip is shaped in the form of a bridge or an arc. The ends of the clip have fastening means that cooperate with corresponding fastening means on the base. After assembly of the connection box, the clip is placed over the cable and attached to the base. The electric cable is then surrounded by the clip and base on all sides, approximately in the form of a tunnel.

The important advantage of the invention can be regarded as the fact that the clip 18 absorbs tensile forces directed at an angle to the fastening surface of the connection box 10 and relieves the stress on the closures of the cover—namely the barbs 22—regard to the forces that occur. Consequently, much higher tensions can be absorbed by the inventive clip and the strain relief function that is known from the prior art and consists essentially of the interaction of the inventive clip and an angled cable guide and cable hole. The strain relief of the connection box 10 still remains simple and inexpensive and is embodied in a particularly advantageous manner especially with regard to machine preassembly.

I claim:

1. A box for connecting a solar panel to a cable, the box comprising:
    a generally planar flat base securable to a solar panel, forming a transversely open cavity for connection of elements of the solar panel with the cable, and formed with a laterally open aperture;
    a flat cover fittable transversely with the base to close the cavity and formed with an aperture forming with the aperture of the base when the cover is fitted to the base a hole that opens generally parallel to the base into the cavity and that is snugly fittable around the cable; and
    a clip unitarily formed of one piece with the base, fixed on the base outside the cavity adjacent the aperture, and forming a mouth fittable around the cable extending through the hole and open generally parallel to the base.

2. The connection box defined in claim 1 wherein the clip has an outer leg extending generally parallel to the base.

3. A box for connecting a solar panel to a cable, the box comprising:
    a generally planar flat base securable to a solar panel, forming a transversely open cavity for connection of elements of the solar panel with the cable, and formed with a laterally open aperture;
    a flat cover fittable transversely with the base to close the cavity and formed with an aperture forming with the aperture of the base when the cover is fitted to the base a hole that opens generally parallel to the base into the cavity and that is snugly fittable around the cable;
    a clip fixed on the base adjacent the aperture and forming a mouth fittable around the cable extending through the hole and open generally parallel to the base; and
    a transversely extending closure that closes the mouth when the cover is fitted to the base.

4. The connection box defined in claim 3 wherein the closure is formed on the cover.

5. The connection box defined in claim 4 wherein the closure is a tongue extending when the cover is fitted to the base perpendicular to the base.

6. The connection box defined in claim 5 wherein the base is formed adjacent the mouth with a groove in which an outer end of the tongue is received when the cover is fitted to the base.

* * * * *